US012625286B2

(12) United States Patent
 Alexandra Muntean et al.

(10) Patent No.: US 12,625,286 B2
(45) Date of Patent: May 12, 2026

(54) IMAGING SYSTEM WITH SILICON PHOTOMULTIPLIERS AND METHOD FOR OPERATING THEREOF

(71) Applicant: ECOLE POLYTECHNIQUE FEDERALE DE LAUSANNE (EPFL), Lausanne (CH)

(72) Inventors: Andrada Alexandra Muntean, Neuchâtel (CH); Edoardo Charbon, Jouxtens-Mézery (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 180 days.

(21) Appl. No.: 18/292,822

(22) PCT Filed: Jul. 27, 2021

(86) PCT No.: PCT/EP2021/071002
 § 371 (c)(1),
 (2) Date: Jan. 26, 2024

(87) PCT Pub. No.: WO2023/006186
 PCT Pub. Date: Feb. 2, 2023

(65) Prior Publication Data
 US 2024/0369724 A1 Nov. 7, 2024

(51) Int. Cl.
 *G01T 1/24* (2006.01)
(52) U.S. Cl.
 CPC .................................... *G01T 1/248* (2013.01)
(58) Field of Classification Search
 CPC ....... G01T 1/248; G01T 1/2985; A61B 6/037; A61B 5/055
 See application file for complete search history.

(56) References Cited

U.S. PATENT DOCUMENTS

2011/0147567 A1 6/2011 Grazioso
2021/0093261 A1 4/2021 Kim

FOREIGN PATENT DOCUMENTS

EP 2921882 B1 * 12/2024 ............. G01T 1/249

OTHER PUBLICATIONS

International Search Report for PCT Application No. PCT/EP2021/071002, mailed Mar. 25, 2022.
Schulz et al., A Preclinical PET/MR Insert for a Human 3T MR Scanner, 2009 IEEE Nuclear Science Symposium and Medical Imaging Conference (NSS/MIC 2009), Oct. 24, 2019, pp. 2577-2579.
Muntean, et al., "Blumino: The First Fully Integrated Analog SiPM With On-Chip Time Conversion," IEEE Transactions on Radiation and Plasma Medical Sciences, vol. 5, No. 5, Dec. 1, 2020, pp. 671-678.

* cited by examiner

*Primary Examiner* — Uzma Alam
*Assistant Examiner* — Fani Polyzos Boosalis
(74) *Attorney, Agent, or Firm* — Andrus Intellectual Property Law, LLP

(57) ABSTRACT

The present invention relates to an integrated imaging system. The integrated imaging system includes an array of analog photomultiplier elements. The integrated imaging system includes a plurality of submodules, each submodule having a number of the photomultiplier elements. The integrated imaging system includes a plurality of time-to-digital converters each associated and coupled with one of the submodules. The plurality of time-to-digital converters are configured to provide a respective timing information.

15 Claims, 6 Drawing Sheets

IMAGING SYSTEM WITH SILICON PHOTOMULTIPLIERS AND METHOD FOR OPERATING THEREOF

CROSS-REFERENCE TO RELATED APPLICATIONS

This application is the U.S. national stage application of International Application No. PCT/EP2021/071002, filed on Jul. 27, 2021, which international application was published on Feb. 2, 2023, as International Publication WO 2023/006186 A1 in the English language. The international application is incorporated herein by reference, in its entirety.

TECHNICAL FIELD

The present invention relates to imaging devices with an array of silicon photomultipliers with an improved timing resolution.

TECHNICAL BACKGROUND

During the last decades, there has been a significant interest in the development of silicon photomultipliers (SiPM) as a replacement of the well know photomultiplier tubes (PMTs) which have been widely used in medical applications, such as positron emission tomography (PET) due to their stability, low noise, suitable spectral range and fast response. Over the past 20 years, more interest has been shown towards the combination of PET and magnetic resonance imaging (MRI) scanners for clinical imaging. PET-MRI scanners are beneficial in many medical disciplines such as oncology, cardiology, pediatrics, neurology etc. as they provide both functional and anatomical information, with high spatial resolution and very good soft-tissue contrast while performing simultaneous acquisitions.

Silicon photomultiplier (SiPM) arrays are arrays of avalanche photodiodes that operate above the breakdown voltage, proved to be suitable candidates for PET and PET-MRI scanners due to their robustness, insensitivity to magnetic fields, low noise, high PDE and low voltage operation. The insensitivity to magnetic fields is very important because a lot of research is put into integrating PET-MRI scanners together, as they provide both functional and anatomical information, with high spatial resolution and very good soft-tissue contrast.

Basically, there are two main types of SiPMs, digital SiPMs and analog SiPMs. Digital SiPMs have the output signal directly processed on-chip, with photons being detected and converted into digital signals. Due to the additional electronics presented in the digital SiPMs, in general, the area fill factor could be highly degraded.

In analog SiPMs, the output currents of each avalanche photodiode are summed up into one node and, in general, the output pulse is processed using off-chip circuits such as shaping circuits, TDCs etc. The large capacitance at the output path significantly impacts the timing performance of the detector.

Furthermore, analog SiPMs usually have a lower system compactness, particularly when analog SiPMs are coupled with readout electronics which are externally provided by separate application-specific integrated circuits. The two separate entities, SiPM and readout circuitry, coupled together results in a bulkier system. Considering for example an array of analog SiPMs, each of them with its own external readout, this will result in high complexity particularly with respect to wiring. Moreover, the power dissipation of such multi-ASIC systems is very high.

Main limitations of analog SiPMs can be overcome by integrating an SiPM array with on-chip electronics such as a discriminator and a time to digital converter (TDC) while keeping the sensor backward-compatible. Such an integration of analog SiPMs is e.g. disclosed in A. Muntean et al., "Blumino: the first fully integrated analog SiPM with on-chip time conversion" IEEE, DOI 10.1109/TRPMS.2020.3045081, and allows to improve the performance of a system based on analog SiPMs.

Due to the improved dynamic behavior in integrated analog SiPMs there has been disclosed to provide an analog SiPM device by adding a third fast terminal in addition to the standard terminals. The fast terminal presents a lower output capacitance compared to standard terminal that makes it suitable for ultra-fast timing measurements. By having the high-speed and optimized electronics on the same silicon, the capacitive load should be substantially improved, thus improving the overall timing performance.

However, the high clocking rate of the time to digital converter which evaluates the fast terminal signal, may lead to counter errors due to glitches of concurrently occurring edges of relevant signals which cannot be corrected after the timing data has been read out.

Document US 2011/147,567 A1 discloses a silicon photomultiplier comprising multiple photodetection cells clusters connected in parallel. Each cluster has its own read-out circuit which includes an analog-to-digital converter which converts the energy information received by each cluster into a digital signal. Moreover, the read-out circuit generates timing triggers using, for example, a CFD or leading edge tracker.

It is an object of the present invention to provide an imaging system with segmented silicon photomultipliers with an improved timing resolution.

SUMMARY OF THE INVENTION

This object is achieved by the imaging system having silicon photomultipliers according to claim 1 and a method for operating an imaging system with silicon photomultipliers according to the further independent claim.

Further embodiments are indicated in the depending sub-claims.

According to a first aspect an integrated imaging system is provided, comprising:

an array of analog photomultiplier elements;

a plurality of submodules, each submodule having a number of the photomultiplier elements;

a plurality of time-to-digital converters each associated and coupled with one of the submodules, wherein the plurality of time-to-digital converters are configured to provide a respective timing information.

Furthermore, the photomultiplier elements of each submodule may have a plurality of photodiodes, particularly single photon avalanche diodes, wherein a standard terminal is provided for each submodule, wherein the standard terminal is formed by the interconnection of the anode or cathode of the photodiodes of the respective submodule, wherein the standard terminal is connected with a corresponding read-out circuit to provide an energy information associated with the number of detection events in the respective submodule during a sampling time.

Alternatively or additionally, the photomultiplier elements of each submodule may have a plurality of photodiodes, particularly single photon avalanche diodes, wherein a fast terminal is provided for each submodule, wherein the fast terminal is coupled, particularly via a respective capacitor, with the intermediate nodes of all of the photomultiplier elements of the respective submodule, wherein the intermediate node is provided between the respective photodiode and a respective resistor, wherein the fast terminal is connected with the corresponding time to digital converter.

The imaging system comprises an array of segmented analog silicon photomultipliers with embedded discrimination, time and energy conversion. The imaging system is based on an analog SiPM design. The output currents of the avalanche photodiodes are summed up into one node, and conventionally, the output is processed using off-chip electronics such as shaping circuits and timing circuits (TDCs). In order to reduce the large capacitance at the output path which significantly impacts the timing performance, above imaging system is implemented as a fully integrated analog silicon photomultiplier with on-chip electronics for timing and energy measurements.

The array of single photon avalanche diodes whose cathode is connected together is divided into multiple SiPM clusters or submodules. Each submodule has two output terminals, a standard terminal with a naturally higher output capacitance which is used for energy measurements and a fast terminal with a lower capacitance which is specifically designed to have a sharp rising time being dedicated for fast timing measurements. The configuration of the fast terminal is e.g. disclosed in A. Muntean et al., "Blumino: the first fully integrated analog SiPM with on-chip time conversion" IEEE, DOI 10.1109/TRPMS.2020.3045081. The fast terminal provides a signal indicating the timing of a detection event after a start signal with a low capacitance, while a standard terminal provides a summed energy indication.

The standard terminal provides an output which is caused by a photon arriving at the SiPM. The sharp rise in current will cause the anode voltage to spike. Because of inherent capacitances and resistances, the rise time is significant and the amplitude of the anode voltage spike is proportional to the energy of the detected photon.

If the standard terminal is coupled through a capacitor, the resulting output signal corresponds to the mathematical derivative of the anode voltage spike, and therefore has a much faster rise time used for the fast terminal. The effect is further improved by a capacitive divider that may be formed at the output which causes a reduction in the capacitive load. The downside is that the amplitude of the signal at the fast terminal is no longer directly connected to the energy of the photon. Every time a photon is absorbed by the detector a pulse is generated at the standard terminal and the fast terminal. The readout electronics (TDC etc.), however, will only catch the first detection event, after which it will need a reset.

The standard terminal of each SiPM submodule is preferably coupled with an individual analog-to-digital converter (ADC) and the fast terminal is coupled with an individual time-to-digital converter (TDC). The ADC takes as an input the analog signal of the standard terminal and outputs the energy information in a digital format. In addition, the spatial information is available as well by identifying the submodule by determining which of the submodules has/have been triggered. The TDC outputs the digitalized timing information of each submodule. These three parameters: energy, timing and spatial resolution are crucial for improving the image quality in a PET (Positron emission tomography) application.

The proposed architecture mainly addresses the problem of the large output capacitance due to the coupling of analog SiPMs with external electronics along with the bulkiness of analog SiPM coupled with ASICs. Above imaging system, therefore, proposes an architecture in which the analog SiPM is integrated in a single chip creating a more compact module.

In addition to this, one of the main issues in PET application is the timing resolution. A very good timing resolution (10 ps-20 ps) is essential in order to better estimate the gamma interaction time and position in the crystal, which translates to a better tumor localization in the patient by acquiring higher quality images of the patient.

Therefore, the above design proposes a technique for improving the timing resolution by using a completely reconfigurable TDC with an automatic on-chip error correction algorithm in addition to the electronics being integrated on the same silicon substrate which minimizes the capacitive load.

Each cluster comprises a TDC, connected to the timing path. This configuration of the imaging system is capable of performing timing and energy measurements by improving the timing resolution while keeping the entire system compact.

For the automatic on-chip error correction, each of the time-to-digital converters may have a ring oscillator to provide a periodic signal used for incrementing a counter during a sampling period, wherein the counter provides the most significant bits of the timing information, wherein a correction unit is provided which is configured to determine a missed count of the counter and to provide a first correction bit for adding to the counter value.

Particularly, the correction unit may be configured to generate the first correction bit depending on a state of a signal CLK_COUNT incrementing the counter and the periodic signal of the ring oscillator delayed by not more than half of the period time of the ring oscillator.

Furthermore, phase registers may be used to provide least significant bits of the timing information, wherein at least one of the phase registers is configured to latch the state of the ring oscillator according to a delayed stop signal, wherein the stop signal signalizes the end of the sampling period and wherein the delayed stop signal is delayed by not more than the half of the period time of the ring oscillator, wherein the delayed periodic signal is obtained by an output of the phase register.

Moreover, each of the time-to-digital converters may have a ring oscillator to provide a periodic signal used for incrementing a counter during a sampling period, wherein the counter provides the most significant bits of the timing information, wherein a correction unit is provided which is configured to determine an additional count of the counter and to provide a second correction bit for subtracting from the counter value.

Particularly, the correction unit is configured to generate the second correction bit depending on the result of verification whether the least significant bit of the counter value has changed its state briefly after end of the sampling period, wherein particularly a delay element, particularly a latch or a gate, is provided to delay the least significant bit of the counter value with respect to the end of the sampling period, wherein the result of the verification is obtained by XORing the least significant bit of the counter value and the delayed least significant bit of the counter value.

The correction unit may be configured to generate the second correction bit further depending on a state number of the different latch states of the ring oscillator.

BRIEF DESCRIPTION OF THE DRAWINGS

Embodiments are described in more detail in conjunction with the accompanying drawings in which.

DESCRIPTION OF EMBODIMENTS

Figure 1:
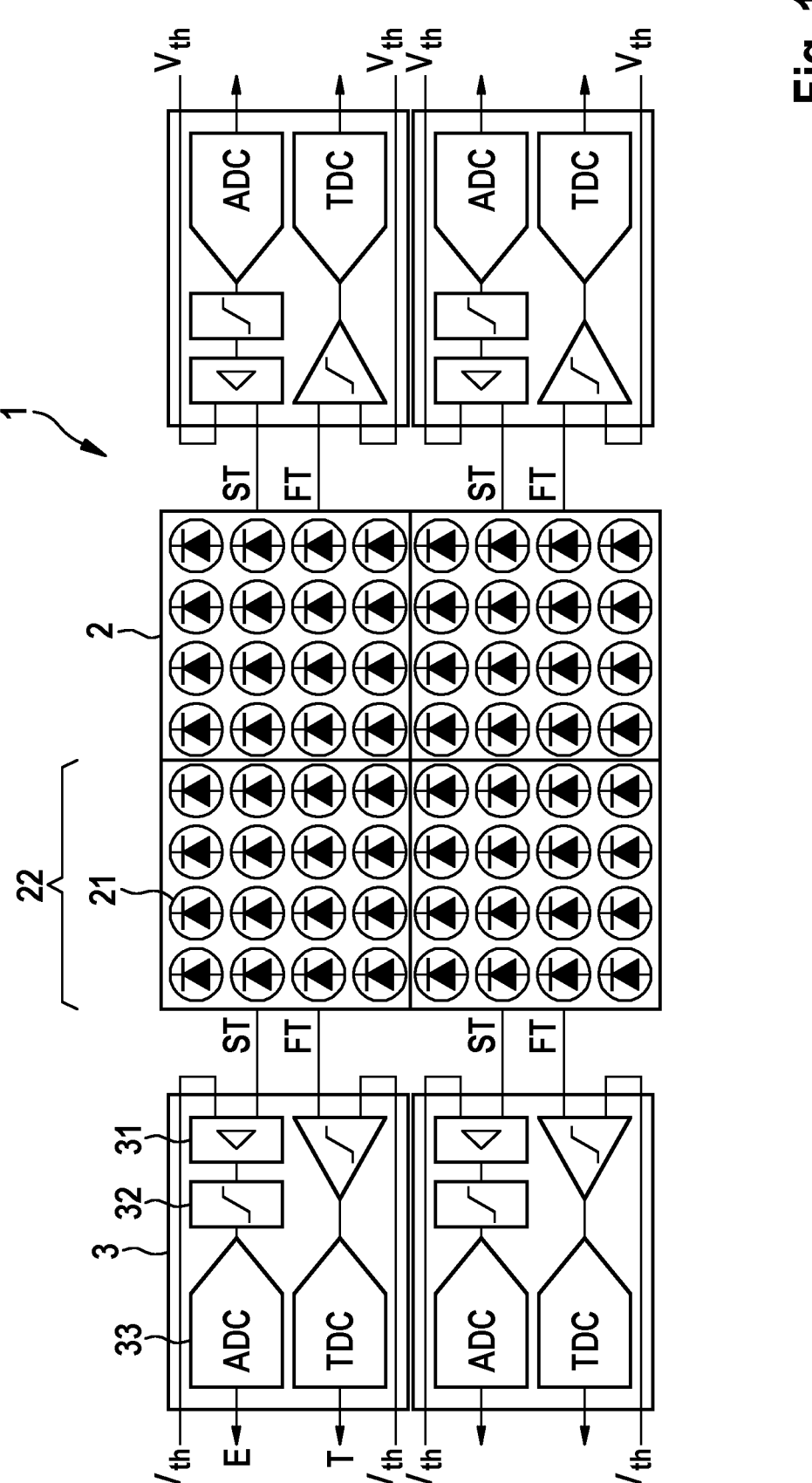
FIG. 1 schematically shows the architecture of the segmented silicon photomultiplier on a chip with segments of photomultipliers and dedicated read-out circuits for providing a timing and energy signal for each photomultiplier segment.

FIG. 1 schematically shows an imaging system 1 on a chip with a photomultiplier array 2 having silicon photomultiplier elements 21 arranged in the two-dimensional matrix. The silicon photomultiplier elements 21 are segmented in submodules 22, each of which is associated with a read-out circuit 3.

The integration can be made on silicon substrate using a conventional CMOS technology.

Each read-out circuit 3 is considered to provide an energy information E and a timing information T on a corresponding output of the imaging system 1. Energy information E and a timing information T are provided as digital data.

A plurality of silicon photomultiplier elements 21 in each submodule 22 are interconnected to provide a pixel information for imaging applications. In the present embodiment, 16 photomultiplier elements 21 are interconnected as e.g. shown in FIG. 2. Each submodule 22 represents a single pixel for imaging applications.

The photomultiplier elements 21 each have a single-photon avalanche diode 212 with its cathodes interconnected and its anodes connected in series with a first terminal of a respective resistor 213. Second resistor terminals are interconnected and form the standard terminal ST for the respective submodule 22 which is used for energy measurements. The standard terminal ST is read-out by a comparator 31 of the corresponding read-out circuit 3 which provides a signal pulse for each detection in one of the photomultiplier elements 21. By using a counter or integrator circuit 32, the transferred charges are accumulated and provided to an analog-digital converter (ADC) 33 of the read-out circuit 3 to provide the energy information E associated with the number of detection events in the respective submodule 22, preferably in digitalized manner.

Figure 2:
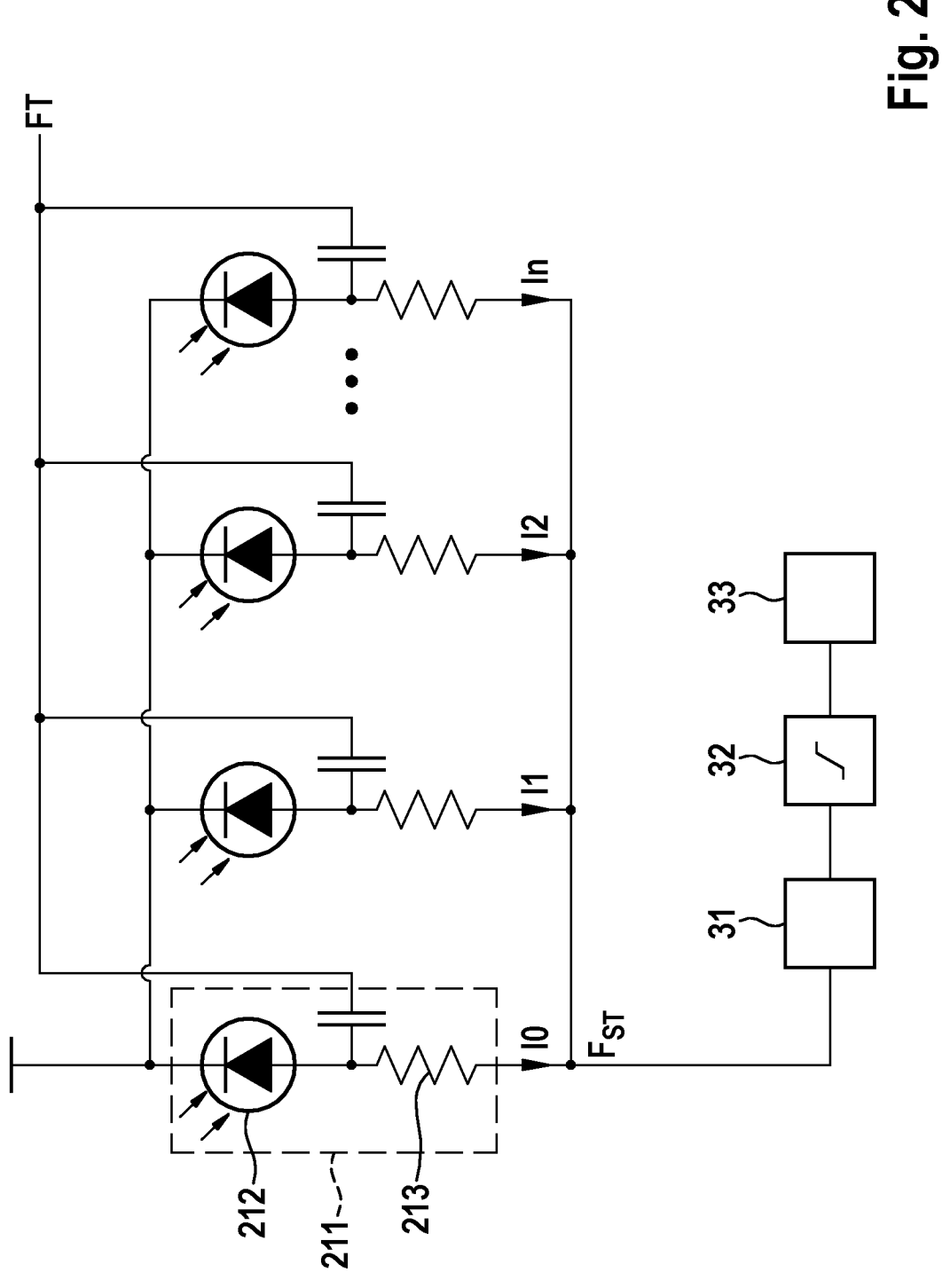
FIG. 2 shows a circuitry of an analog silicon photomultiplier with a standard and fast terminal.

As further shown in FIG. 2, the interconnected anodes which form the standard terminal ST are coupled with the comparator 31, and the resulting charge pulses are accumulated in the integrator 32. After sampling time periods, the accumulated charge and the integrator 32 is digitally converted by means of the analog-to-digital converter 3. The signal pulses at the output of the comparator 31 may be used to provide a start signal START to control a time-to-digital converter (TDC) 34 used to provide the timing information T. However, it may be preferred to extract a timing information from the fast terminal signal.

Figure 3:
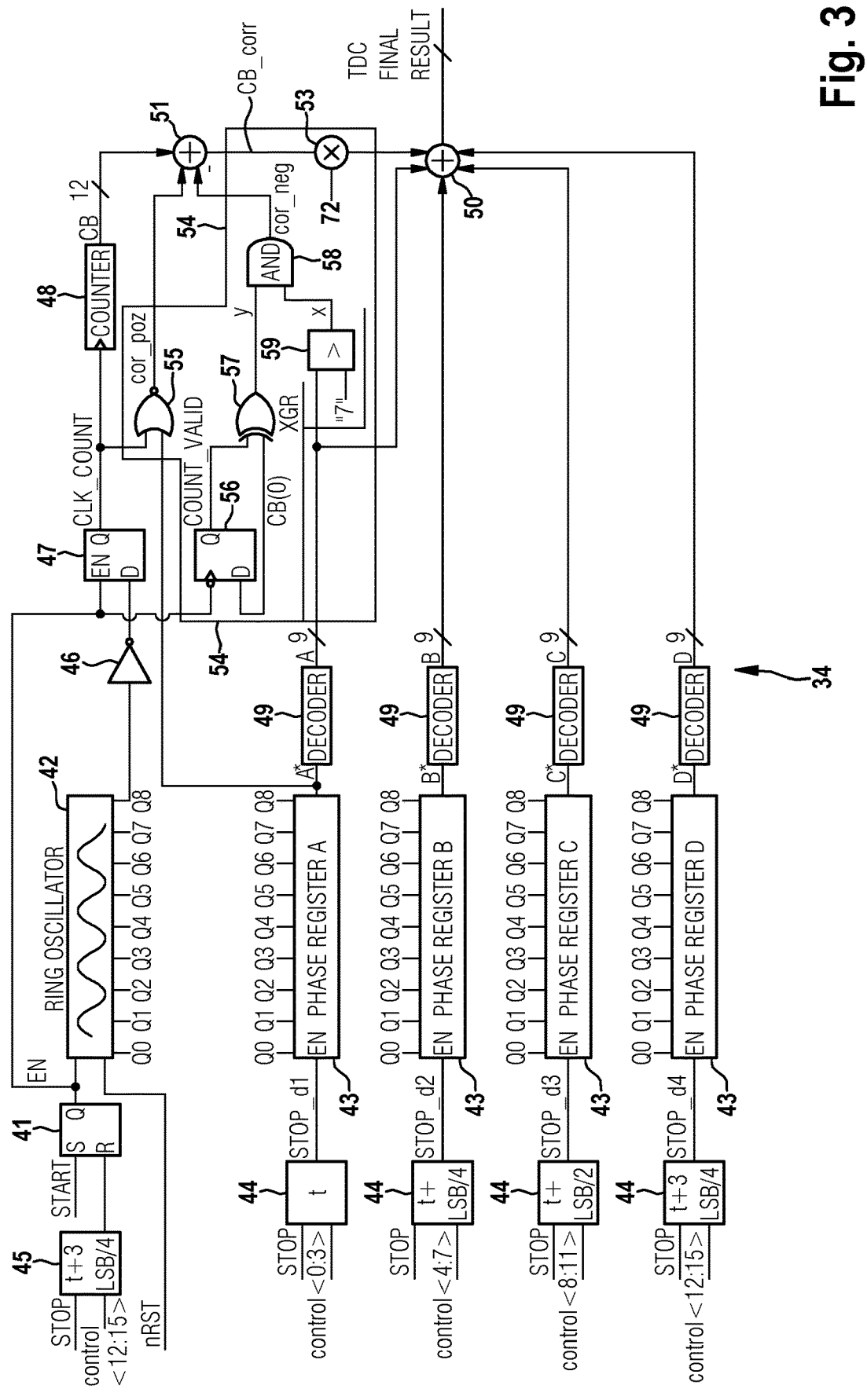
FIG. 3 shows a block diagram of the time to digital converter.

FIG. 3 schematically shows a block diagram of a time-to-digital converter (TDC) 34 as e.g. can be used in an imaging system 1 with the silicon photomultiplier array 2.

The TDC 34 is used to measure a time between a start time of a sampling period being the time of the first occurrence of a detection event in the photomultiplier submodule 22. The start of the sampling period is indicated by the start signal START while the stop of the sampling period is indicated by the stop signal STOP which usually is externally provided, e.g. periodically with a constant frequency or with a constant delay with respect to the start signal START. An additional START signal may be generated with the same frequency as the stop signal STOP but an adjustable phase with respect to the stop signal STOP which allows different impulse pulse widths to be fed to the TDC 34.

The start signal START is connected with a set input S of an SR-latch 41 at the output of which an enable signal EN for a ring oscillator 42 is provided. The ring oscillator 42 is formed by serial delay elements as known in the art, in the present example 9 delay elements. These delay elements are inverters or buffers. The outputs Q0, Q1 . . . of the delay elements can only be in a predefined combination of '0' and '1' which depends on the ring structure. These combinations are the "states" of the ring oscillator.

The reset input R of the SR-latch 41 is connected with an output of a delay unit 45 which provides a rising edge on the occurrence of a rising edge of the stop signal STOP which is delayed by ¾ LSB. In general, the delay is (N−1)/N LSB where N is the number of phase registers 43 connected to the ring oscillator 42 in the TDC 34, where LSB is related to the period time of the oscillation Tosc of the ring oscillator 42, i.e. LSB is Tosc/(2*Z), where Z is the number of oscillation stages which in the present case corresponds to 9. In order to complete one oscillation in the ring oscillator 42, the signal has to pass two times through the ring oscillator 42.

In the present embodiment, the ring oscillator 42 has 9 bits indicated by output signals Q0 . . . Q8 which are connected with four phase registers 43 which are triggered with a delayed stop signal STOP_d1, STOP_d2, STOP_d3, STOP_d4. The delayed stop signals STOP_d1, STOP_d2, STOP_d3, STOP_d4 respectively have with different delays, 0 LSB, ¼ LSB, ½ LSB, ¾ LSB. The delayed stop signal STOP_d1, STOP_d2, STOP_d3, STOP_d4 are generated by means of respective delay units 44. By means of the phase registers 43 an additional phase information of the ring oscillator 42 is determined.

One of the outputs of the ring oscillator 42, e.g. the output Q8 in the present embodiment, is coupled via an inverter 46 with a D-input of a D-latch 47 which is operable as long as the enable signal EN is at its enabling state. The output of the D-latch 47 corresponds to a clock-counting signal CLK_count which is provided to a counter 48 to count for the most significant bits MSB, CB of the timing information T to be produced.

To provide the five least significant bits of the timing information T, the four phase registers 43 are provided which receive the outputs Q0 . . . Q8 of the stages of the ring oscillator 42 at different times indicated by an associated edge of the delayed stop signals STOP_d1, STOP_d2, STOP_d3, STOP_d4, respectively. So, the contents of the phase registers 43 are latched from the ring oscillator 42 triggered by the four delayed stop signals STOP_d1, STOP_d2, STOP_d3, STOP_d4.

Figure 4:
FIG. 4 schematically shows an example for a delay unit to provide delayed stop signals for phase registers.

The delayed stop signal STOP_d1, STOP_d2, STOP_d3, STOP_d4 is respectively generated by the stop signal STOP which is delayed by a delay time of 0 LSB ¼, LSB ½ and ¾ LSB which means delayed by the corresponding portion of the oscillation period of the ring oscillator 42. The delay units 44 can be controlled by a respective control signal control<0:3>, control<4:7>, control<8:11>, control<12: 15>. The delay units 44 may have a circuitry as shown in FIG. 4 wherein a delay line 441 between two inverters 442, 443 is coupled with a number of e.g. four switchable capacities C0, C1, C2, C3 which are coupled or decoupled from the delay line 441 depending on the control signal control<0:3>.

The phase information items of the first to fourth phase registers 43 may be decoded in corresponding first to fourth decoders 49 the output of which are the state numbers of the bit combination latched from the ring oscillator 42 indicated as decoder outputs A, B, C, D. The output of the decoders 49 are state numbers from 0 to 17 in this order according to the possible states of bit combinations formed by the propagating signal through the ring oscillator 42. Preferably, at the time of the start signal START the state number is set to "0".

In a first summing unit 50 the decoder outputs A, B, C, D and the corrected counter value CB multiplied by 72 in a multiplying unit 53 are added. The value 72 (used in the multiplying unit 53) results from the 18 possible states and the number (4) of the phase registers 43 used (which are multiplied). In a second summing unit 51 the counter value CB and the first correction signal cor_poz (0 or 1) are added to the output of the first summing unit 50 and the second correction signal cor_neg (0 or 1) is subtracted therefrom to obtain the corrected counter value CB_corr.

Figure 5:
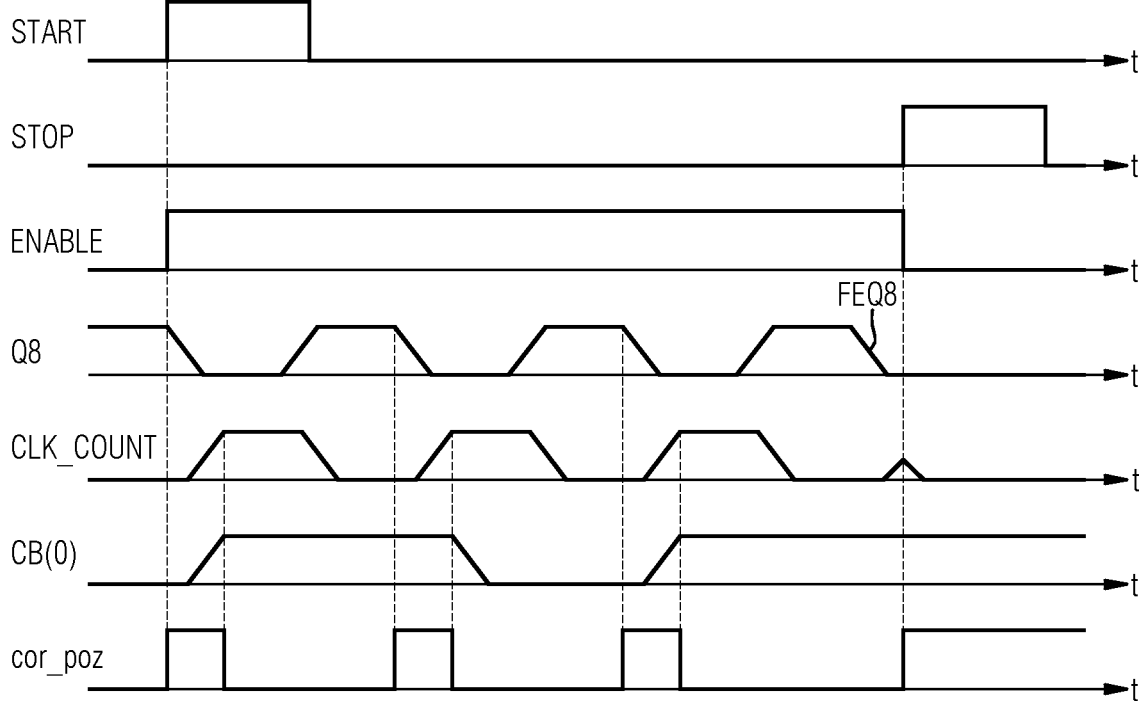
FIG. 5 shows a signal time diagram to illustrate the occurrence of a counter error in the time-to-digital converter.

Due to the asynchronous relationship between the output of ring oscillator 42 and the enable signal EN generated by SR latch 41, the setup or hold requirements of D latch 47 are not always satisfied. This can lead to the unfortunate event when because of metastability, a glitch will manifest at the output of D latch 47. Such a glitch may affect counter 48 by erroneously non-incrementing. This is e.g. shown with the timing diagram of FIG. 5. The timing diagram shows the time characteristics of the start signal START, the stop signal STOP, the enable signal ENABLE, the bit Q8, the least significant bit of the counter value CB stored in the counter 48 and a value of a first correction bit cor_poz. FIG. 5 illustrates the occurrence of a glitch due to concurrent falling edge of the enable signal EN and the falling edge FEQ8 of Q8, which is inverted by inverter 46, serves as an input for D-latch 47.

Here, a glitch can be seen at the output of the D latch when a rising edge of the D-input of the D-latch 47 has not fully occurred when the enable signal EN shows a falling edge to disable the D-latch 47. This may lead to a situation where a rising edge at the output of the D-latch 47 is not fully established which may result in that the output of the D-latch 47 will return to the "0" state after a small glitch towards the potential of the "1" state. This may lead to a non-counting of the counter 48 which leads to an error in the counter value CB as one counter increment is missing. Here the first correction bit cor_poz should be set to value "1" to compensate for this error.

Figure 6:
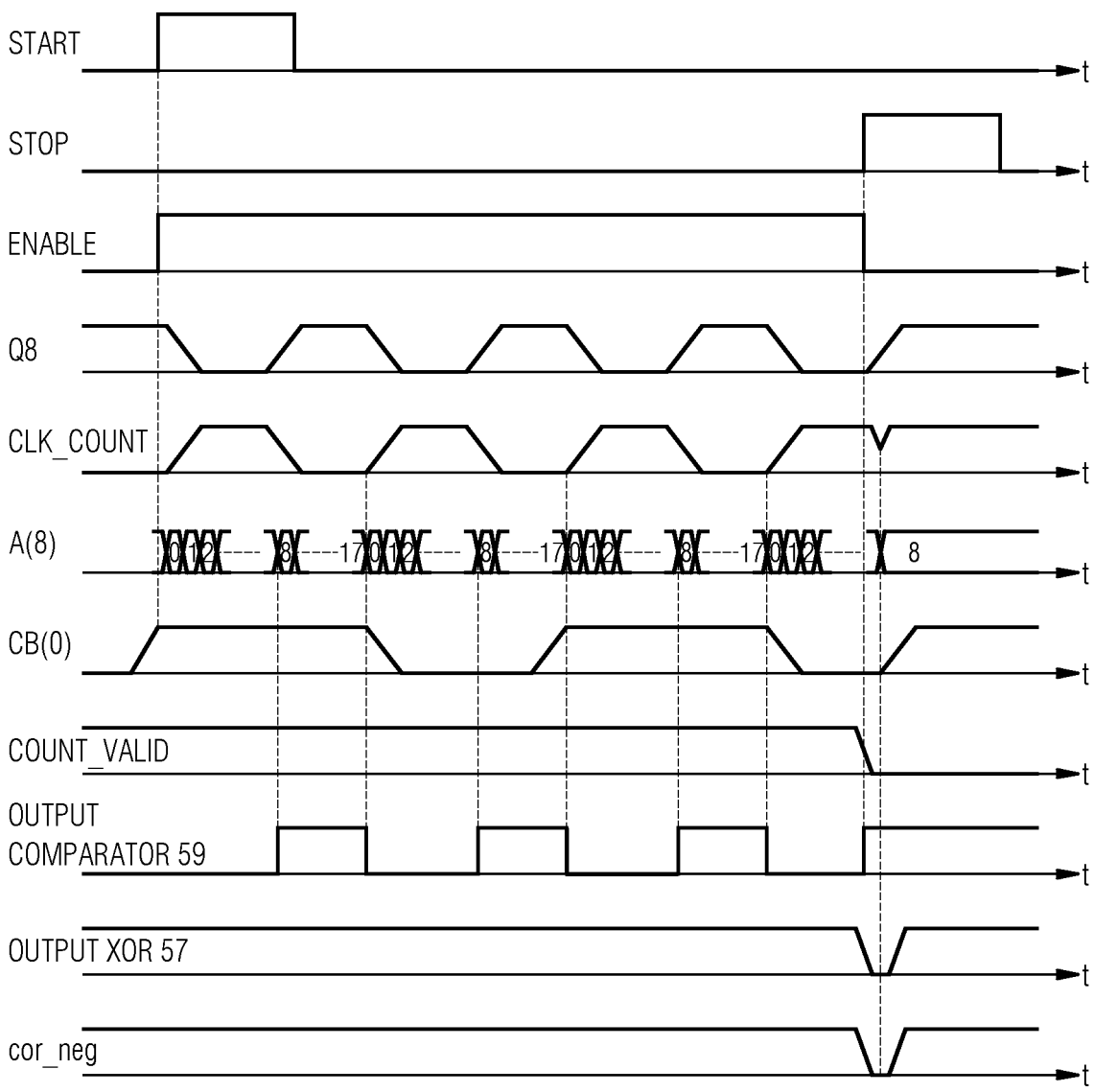
FIG. 6 shows a signal time diagram to illustrate the occurrence of another counter error in the time-to-digital converter.

In FIG. 6, a timing diagram for a falling edge at the D-input of the D-latch 47 is shown which has not fully occurred at the time of the disabling of the enable signal EN.

The timing diagram shows the time characteristics of the start signal START, the stop signal STOP, the enable signal ENABLE, the bit A8 of the decoder output associated with the first phase register 43 which latches the content of the ring oscillator 42 with the stop signal STOP or the non-delayed (by the first delay unit 44) stop signal STOP_d1, the least significant bit of the counter value CB(0) stored in the counter 48, a count_valid signal COUNT_VALID, a first intermediate signal and a second intermediate signal and a value of a second correction bit cor_neg.

Here, the same effect may occur for the falling edge of the D-input of the D-latch 47 which is delayed with respect to the end of the enabling sampling period. Here, a glitch can be seen at the output of the D-latch 47 when the falling edge of the D-input of the D-latch 47 has not fully occurred when the enable signal EN shows a falling edge to disable the D-latch 47. This may lead to a situation where the falling edge at the output of the D-latch 47 is not fully established which may result in that the output of the D-latch 47 will return to the "1" state after a small glitch towards the potential of the "0" state. This may lead to a counting (incrementing) of counter 48 which leads to an error in the counter value CB of counter 48 as actually the rising edge of the CLK_COUNT signal was not real.

To compensate for the effects of the glitches, the first and second correction signal cor_poz, cor_neg have to be generated to be provided to the second summing unit 51.

A correction unit 54 is provided which is configured to provide the first and second correction signal cor_poz, cor_neg at the arrival of the stop signal (rising edge).

The first correction signal cor_poz is generated by an NOR-gate 55 which receives the clock count signal CLK-_COUNT and the most significant bit A*(8) of the first phase register 43 (triggered by the delayed stop signal STOP_d1). Only if both signals equal "0" the first correction signal cor_poz is set to "1". The bit A8 of the phase register latches the state of the Q8 bit of the ring oscillator. The Q8 bit of the ring oscillator 42 signalizes that a new pulse of the clock count signal clk_count should be generated. The OR-gate 55 checks if this new pulse of the clock count signal CLK-_COUNT has been generated. If positive, no correction by the first correction bit cor_poz is needed otherwise the first correction bit cor_poz has to be set to "1".

In the opposite case, the second correction bit cor_neg is generated by means of a further D-flipflop 56, an XOR gate 57, an AND-gate 58 and a comparator unit 59. The further D-flipflop 56 latches the least significant bit of the counter value CB(0) at the time of the stop signal STOP to provide at its output a count value signal COUNT_VALUE. If immediately after the occurrence of the stop signal STOP the counter value CB changes, this will be detected by the XOR gate 57 (indicated by "1" at its output). The output of the XOR gate 57 will be provided to the AND gate 58.

As a further condition for generating the second correction bit cor_neg, the comparator unit 58 is used to check if the time relation of the ring oscillator 42 is not timely close to state numbers which are associated with a rising edge of the clock count signal CLK_COUNT. In this implementation, the counter 48 should only increment when the phases transition from "17" to "0" (a falling edge on Q8, rising edge on CLK_COUNT), not from "8" to "9" (a rising edge on Q8, falling edge on CLK_COUNT). It can be easily checked which state number regime is present by comparing the final state with "7". this number can be chosen instead of "8" which is the actual middle of the range, because the evaluation circuitry is much simpler. This is illustrated in FIG. 6. So, the output of the XOR gate 57 is validated by the comparator unit 59 output. The output of the AND-stage 58 corresponds to the second correction bit cor_neg.

The invention claimed is:

1. An integrated imaging system comprising:
an array of analog photomultiplier elements;
a plurality of submodules, each submodule having a number of the photomultiplier elements; and
a plurality of time-to-digital converters each associated and coupled with one of the submodules, wherein the plurality of time-to-digital converters are configured to provide a respective timing information;

wherein each of the photomultiplier elements of each submodule has a photodiode, wherein a fast terminal is provided for each submodule, wherein the fast terminal is coupled, particularly via a respective capacitor, with the intermediate nodes of all of the photomultiplier elements of the respective submodule, wherein the intermediate node is provided between the respective photodiode and the respective resistor, wherein the fast terminal is connected with the corresponding time-to-digital converter.

2. The imaging system according to claim 1, wherein each of the photomultiplier elements of each submodule has a photodiode, particularly a single photon avalanche diode, wherein a standard terminal is provided for each submodule, wherein the standard terminal is formed by the interconnection of the anode or cathode of the photodiodes of the respective submodule, particularly via a respective resistor, wherein the standard terminal is connected with a corresponding read-out circuit to provide an energy information E associated with the number of detection events in the respective submodule during a sampling time.

3. The imaging system according to claim 1, wherein each of the plurality of time-to-digital converters has a ring oscillator to provide a periodic signal used for incrementing a counter during a sampling period, wherein the counter provides most significant bits of the timing information, wherein a correction unit is provided which is configured to determine a missed count of the counter and to provide a first correction bit for adding to the counter value.

4. The imaging system according to claim 3, wherein the correction unit is configured to generate the first correction bit depending on a state of a signal CLK_COUNT incrementing the counter and the periodic signal of the ring oscillator delayed by not more than half of the period time of the ring oscillator.

5. The imaging system according to claim 4, wherein phase registers are used to provide least significant bits of the timing information, wherein at least one of the phase registers is configured to latch the state of the ring oscillator according to a delayed stop signal, wherein the stop signal signalizes the end of the sampling period and wherein the delayed stop signal is delayed by not more than the half of the period time of the ring oscillator, wherein the delayed periodic signal is obtained by an output of one of the phase registers.

6. The imaging system according to claim 1, wherein each of the plurality of time-to-digital converters has a ring oscillator to provide a periodic signal used for incrementing a counter during a sampling period, wherein the counter provides the most significant bits of the timing information, wherein a correction unit is provided which is configured to determine an additional count of the counter and to provide a second correction bit for subtracting from the counter value.

7. The imaging system according to claim 6, wherein the correction unit is configured to generate the second correction bit depending on the result of verification whether the least significant bit of the counter value has changed its state briefly after end of the sampling period, wherein particularly a delay element, particularly a latch or a gate, is provided to delay the least significant bit of the counter value with respect to the end of the sampling period, wherein the result of the verification is obtained by XORing the least significant bit of the counter value and the delayed least significant bit of the counter value.

8. The imaging system according to claim 7, wherein the correction unit is configured to generate the second correction bit further depending on a state number of the different latch states of the ring oscillator.

9. The positron emission tomography system including an imaging system according to claim 1.

10. An integrated imaging system comprising:
an array of analog photomultiplier elements;
a plurality of submodules, each submodule having a number of the photomultiplier elements; and
a plurality of time-to-digital converters each associated and coupled with one of the submodules, wherein the plurality of time-to-digital converters are configured to provide a respective timing information;
wherein each of the plurality of time-to-digital converters has a ring oscillator to provide a periodic signal used for incrementing a counter during a sampling period, wherein the counter provides most significant bits of the timing information, wherein a correction unit is provided which is configured to determine a missed count of the counter and to provide a first correction bit for adding to the counter value.

11. The imaging system according to claim 10, wherein the correction unit is configured to generate the first correction bit depending on a state of a signal CLK_COUNT incrementing the counter and the periodic signal of the ring oscillator delayed by not more than half of the period time of the ring oscillator.

12. The imaging system according to claim 11, wherein phase registers are used to provide least significant bits of the timing information, wherein at least one of the phase registers is configured to latch the state of the ring oscillator according to a delayed stop signal, wherein the stop signal signalizes the end of the sampling period and wherein the delayed stop signal is delayed by not more than the half of the period time of the ring oscillator, wherein the delayed periodic signal is obtained by an output of one of the phase registers.

13. An integrated imaging system comprising:
an array of analog photomultiplier elements;
a plurality of submodules, each submodule having a number of the photomultiplier elements; and
a plurality of time-to-digital converters each associated and coupled with one of the submodules, wherein the plurality of time-to-digital converters are configured to provide a respective timing information;
wherein each of the plurality of time-to-digital converters has a ring oscillator to provide a periodic signal used for incrementing a counter during a sampling period, wherein the counter provides the most significant bits of the timing information, wherein a correction unit is provided which is configured to determine an additional count of the counter and to provide a second correction bit for subtracting from the counter value.

14. The imaging system according to claim 13, wherein the correction unit is configured to generate the second correction bit depending on the result of verification whether the least significant bit of the counter value has changed its state briefly after end of the sampling period, wherein particularly a delay element, particularly a latch or a gate, is provided to delay the least significant bit of the counter value with respect to the end of the sampling period, wherein the result of the verification is obtained by XORing the least significant bit of the counter value and the delayed least significant bit of the counter value.

15. The imaging system according to claim 14, wherein the correction unit is configured to generate the second correction bit further depending on a state number of the different latch states of the ring oscillator.

* * * * *